United States Patent
Wang

(10) Patent No.: US 11,736,951 B2
(45) Date of Patent: Aug. 22, 2023

(54) METHODS AND DEVICES FOR UPLINK DATA TRANSMISSION AND SCHEDULING ON UNLICENSED BAND

(71) Applicant: NEC CORPORATION, Tokyo (JP)

(72) Inventor: Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/530,107

(22) Filed: Nov. 18, 2021

(65) Prior Publication Data
US 2022/0078628 A1    Mar. 10, 2022

Related U.S. Application Data

(63) Continuation of application No. 16/632,081, filed as application No. PCT/CN2017/093931 on Jul. 21, 2017, now Pat. No. 11,218,884.

(51) Int. Cl.
| | |
|---|---|
| *H04W 16/14* | (2009.01) |
| *H04L 1/16* | (2023.01) |
| *H04L 5/00* | (2006.01) |
| *H04W 72/04* | (2023.01) |
| *H04L 1/1607* | (2023.01) |
| *H04W 72/0446* | (2023.01) |
| *H04W 72/21* | (2023.01) |

(52) U.S. Cl.
CPC ........... *H04W 16/14* (2013.01); *H04L 1/1642* (2013.01); *H04L 5/0094* (2013.01); *H04W 72/0446* (2013.01); *H04W 72/21* (2023.01)

(58) Field of Classification Search
CPC ... H04L 5/0094; H04L 1/1642; H04L 5/0092; H04W 16/14; H04W 72/0446; H04W 72/1289; H04W 72/0413; H04W 72/1268
See application file for complete search history.

(56) References Cited

U.S. PATENT DOCUMENTS

| | | | |
|---|---|---|---|
| 11,051,325 B2* | 6/2021 | Wang | ............... H04W 72/1268 |
| 2016/0183249 A1 | 6/2016 | Lei et al. | |
| 2016/0302225 A1 | 10/2016 | Damjanovic et al. | |

(Continued)

FOREIGN PATENT DOCUMENTS

| | | |
|---|---|---|
| CN | 106162898 A | 11/2016 |
| WO | 2016/105125 A1 | 6/2016 |

OTHER PUBLICATIONS

Written Opinion for PCT/CN2017/093931, dated Apr. 3, 2018.
(Continued)

*Primary Examiner* — Brian D Nguyen
(74) *Attorney, Agent, or Firm* — Sughrue Mion, PLLC

(57) ABSTRACT

Embodiments of the present disclosure relate to a method, terminal device and apparatus for UL data transmission and a method, network device and apparatus for UL data scheduling. In an embodiment of the present disclosure, the method of DL data transmission may comprise receiving, from a network device, information on an ending position of uplink data transmission on the unlicensed band; and determining the ending position of uplink data transmission from the information on the starting position of uplink data transmission, wherein the determined ending position of uplink data transmission is associated with a carrier numerology used by the terminal device. With embodiments of the present disclosure, it could enable the UL data transmission on the unlicensed band in the NR system and thus improve the performance of the NR system.

8 Claims, 6 Drawing Sheets

100

101 — Receiving, from a network device, information on an ending position of uplink transmission of a terminal device on the unlicensed band 102 — Determining the ending position of the uplink transmission from the information on the ending position of uplink transmission, wherein the determined ending position of the uplink transmission is associated with a carrier numerology used by the terminal device

(56) References Cited

U.S. PATENT DOCUMENTS

| | | |
|---|---|---|
| 2018/0324768 A1 | 11/2018 | Shaheen et al. |
| 2019/0200355 A1 | 6/2019 | Baldemair et al. |
| 2020/0036586 A1* | 1/2020 | Gao .................. H04W 72/0446 |
| 2020/0187169 A1* | 6/2020 | Gao ........................ H04L 5/0044 |
| 2020/0245348 A1* | 7/2020 | Chen .................... H04L 5/0064 |
| 2020/0275472 A1 | 8/2020 | Gao et al. |
| 2020/0328924 A1 | 10/2020 | Nangia et al. |
| 2020/0383108 A1* | 12/2020 | Lunttila ............ H04W 72/0446 |
| 2020/0389879 A1* | 12/2020 | Zhang .................. H04L 5/0028 |
| 2020/0413441 A1 | 12/2020 | Bhorkar et al. |
| 2021/0014859 A1 | 1/2021 | Baldemair et al. |
| 2021/0076197 A1 | 3/2021 | Novlan et al. |
| 2021/0120549 A1* | 4/2021 | Tang ..................... H04W 48/12 |
| 2021/0126726 A1 | 4/2021 | Parkvall et al. |

OTHER PUBLICATIONS

International Search Report for PCT/CN2017/093931, dated Apr. 3, 2018.

Nokia, Alcatel-Lucent Shanghai Bell, "Multiple starting and ending positions in a subframe for UL", 3GPP TSG-RAN WG1 Meeting #89, R1-1708180, Hangzhou, P.R. China, May 15-19, 2017 (3 pages total).

NEC, "Frequency and time resource allocation schemes for NR", 3GPP TSG-RAN WG1 Meeting #89, R1-1707200, Hangzhou, P.R. China, May 15-19, 2017 (5 pages total).

Huawei, HiSilicon, " NR frame structure on unlicensed bands", 3GPP TSG RAN WG1 NR Ad-Hoc Meeting, R1-1711466, Qingdao, China, Jun. 27-30, 2017 (7 pages total).

Intel Corporation, "DCI design considerations for NR", 3GPP TSG-RAN WG1 #89, R1-1707384, Hangzhou, P.R. China, May 15-19, 2017 (5 pages total).

LG Electronics, "Discussion on multiple starting and ending positions for LAA UL", 3GPP TSG RAN WG1 Meeting #89, R1-1709160, Hangzhou, P.R. China, May 15-19, 2017 (4 pages total).

Office Action dated Dec. 23, 2022 in Chinese Application No. 201780093328.4.

* cited by examiner

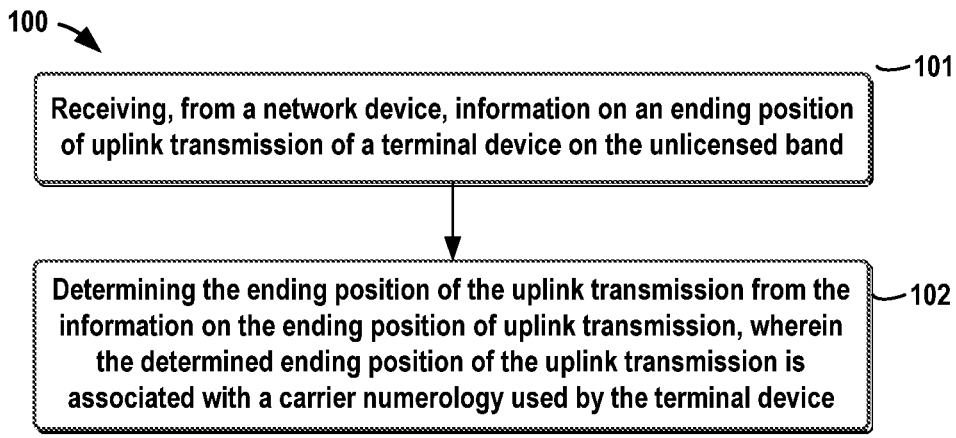
Fig. 1
| SCS | K |
|---|---|
| 15KHz | 1 |
| 30KHz | 2 |
| 60KHz | 4 |
| 120KHz | 8 |
| 240KHz | 16 |
Fig. 2
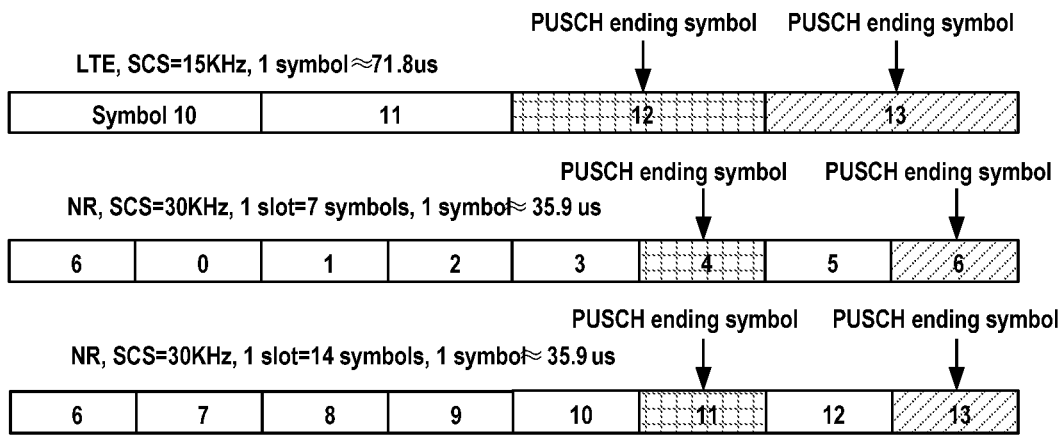
Fig. 3

| SCS | K1 | K when P=7 | K when P=14 |
|---|---|---|---|
| 15KHz | 1 | 1 | 1 |
| 30KHz | 2 | 2 | 2 |
| 60KHz | 4 | 4 | 4 |
| 120KHz | 8 | 1 | 8 |
| 240KHz | 16 | 2 | 2 |

METHODS AND DEVICES FOR UPLINK DATA TRANSMISSION AND SCHEDULING ON UNLICENSED BAND

CROSS REFERENCE TO RELATED APPLICATIONS

This application is a continuation application of U.S. application Ser. No. 16/632,081 filed Jan. 17, 2020, issued as U.S. Pat. No. 11,218,884 on Jan. 4, 2022, which is a National Stage of International Application No. PCT/CN2017/093931 filed Jul. 21, 2017, the contents of all of the above are hereby incorporated by reference.

FIELD OF THE INVENTION

The non-limiting and exemplary embodiments of the present disclosure generally relate to the field of wireless communication techniques, and more particularly relate to a method, terminal device and apparatus for uplink data transmission and a method, network device and apparatus for uplink data scheduling.

BACKGROUND OF THE INVENTION

In order to improve the data rate performance, in the third generation Partnership Project (3GPP) Long Term Evolution (LTE), there is introduced License Assisted Access (LAA) for both downlink and uplink transmission.

To further improve the user's performance, a new radio access system, which is also called as NR system or NR network, has been introduced as the next generation communication system. As the LTE network enters its next phase of evolution with the study of wider bandwidth waveform under the NR project, it is natural for the LAA networks to evolve into the 5G NR system. In RAN meeting #76, a study item called "Study on NR-Based Access to Unlicensed Spectrum" had been agreed.

Regarding the LAA in the NR system, it shall study physical channels inheriting choices of duplex mode, waveform, carrier bandwidth, subcarrier spacing, frame structure, and physical layer design. It shall also study how to avoid unnecessary divergence with decisions made in the NR WI.

In addition, it shall also study physical channels inheriting choices of duplex mode, waveform, carrier bandwidth, subcarrier spacing, frame structure, and physical layer design. It shall also study how to avoid unnecessary divergence with decisions made in the NR WI.

Thus, there is a need for a new solution of UL data transmission and scheduling.

SUMMARY OF THE INVENTION

To this end, in the present disclosure, there is provided a new solution for uplink data transmission and scheduling, to mitigate or at least alleviate at least part of the issues in the prior art.

According to a first aspect of the present disclosure, there is provided a method for uplink data transmission on an unlicensed band in the NR system. The method may comprise receiving, from a network device, information on an ending position of uplink transmission of a terminal device on the unlicensed band, and determining the ending position of the uplink transmission from the information on the ending position of uplink transmission, wherein the determined ending position of the uplink transmission is associated with a carrier numerology used by the terminal device.

According to a second aspect of the present disclosure, there is provided a method of uplink data scheduling on an unlicensed band in a NR system. The method may comprise determining an ending position of the uplink transmission of terminal device on the unlicensed band based on a carrier numerology used by the terminal device; and transmitting, to the terminal device, information on the determined ending position of uplink transmission of a terminal device on the unlicensed band.

According to a third aspect of the present disclosure, there is provided a terminal device. The terminal device may comprise a transceiver, configured to receive, from a network device, information on an ending position of uplink transmission of a terminal device on the unlicensed band; and a controller, configured to determine the ending position of the uplink transmission from the information on the ending position of uplink transmission, wherein the determined ending position of the uplink transmission is associated with a carrier numerology used by the terminal device.

According to a fourth aspect of the present disclosure, there is provided a network device. The network device may comprise a controller, configured to determine an ending position of the uplink transmission of terminal device on the unlicensed band based on a carrier numerology used by the terminal device; and a transceiver, configured to transmit, to the terminal device, information on the determined ending position of uplink transmission of a terminal device on the unlicensed band.

According to a fifth aspect of the present disclosure, there is provided a terminal device. The terminal device may comprise a processor and a memory. The memory may be coupled with the processor and have program codes therein, which, when executed on the processor, cause the terminal device to perform operations of the first aspect.

According to a sixth aspect of the present disclosure, there is provided a network device. The network device may comprise a processor and a memory. The memory may be coupled with the processor and having program codes therein, which, when executed on the processor, cause the network device to perform operations of the second aspect.

According to a seventh aspect of the present disclosure, there is provided a computer-readable storage media with computer program codes embodied thereon, the computer program codes configured to, when executed, cause an apparatus to perform actions in the method according to any embodiment in the first aspect.

According to an eighth aspect of the present disclosure, there is provided a computer-readable storage media with computer program codes embodied thereon, the computer program codes configured to, when executed, cause an apparatus to perform actions in the method according to any embodiment in the second aspect.

According to a ninth aspect of the present disclosure, there is provided a computer program product comprising a computer-readable storage media according to the seventh aspect.

According to a tenth aspect of the present disclosure, there is provided a computer program product comprising a computer-readable storage media according to the eighth aspect.

With embodiments of the present disclosure, it could enable the UL data transmission on the unlicensed band in the NR system and thus improve the performance of the NR system.

BRIEF DESCRIPTION OF THE DRAWINGS

The above and other features of the present disclosure will become more apparent through detailed explanation on the embodiments as illustrated in the embodiments with reference to the accompanying drawings, throughout which like reference numbers represent same or similar components and wherein:

FIG. 1 schematically illustrates a flow chart of a method of uplink data transmission according to an embodiment of the present disclosure;

FIG. 2 schematically illustrates a mapping of subcarrier spacings and scaling factors according to an embodiment of the present disclosure;

FIG. 3 schematically illustrates example possible ending positions of the UL data transmission in the NR system with a subcarrier spacing (SCS) of 30 KHz according to an embodiment of the present disclosure;

DETAILED DESCRIPTION OF EMBODIMENTS

Figure 4:
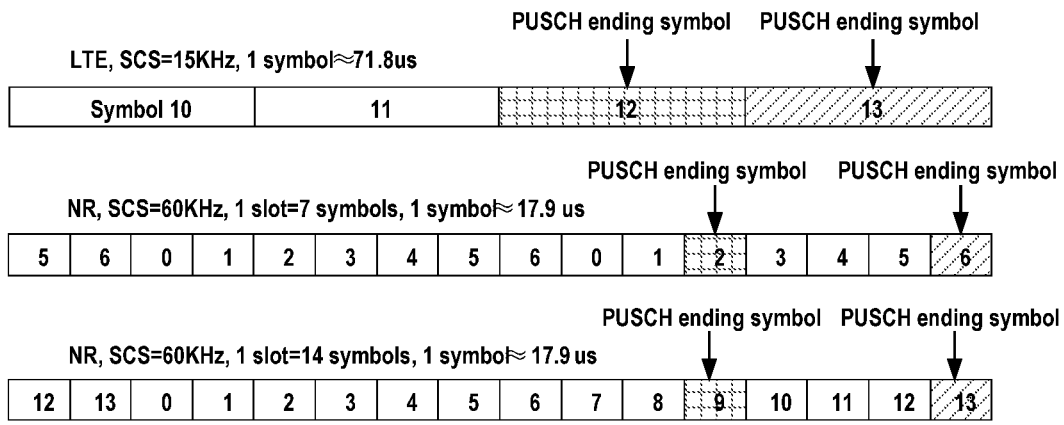
FIG. 4 schematically illustrates example possible ending positions of the UL data transmission in the NR system with a SCS of 60 KHz according to an embodiment of the present disclosure.

Hereinafter, the solution as provided in the present disclosure will be described in details through embodiments with reference to the accompanying drawings. It should be appreciated that these embodiments are presented only to enable those skilled in the art to better understand and implement the present disclosure, not intended to limit the scope of the present disclosure in any manner.

In the accompanying drawings, various embodiments of the present disclosure are illustrated in block diagrams, flow charts and other diagrams. Each block in the flowcharts or blocks may represent a module, a program, or a part of code, which contains one or more executable instructions for performing specified logic functions, and in the present disclosure, a dispensable block is illustrated in a dotted line. Besides, although these blocks are illustrated in particular sequences for performing the steps of the methods, as a matter of fact, they may not necessarily be performed strictly according to the illustrated sequence. For example, they might be performed in reverse sequence or simultaneously, which is dependent on natures of respective operations. It should also be noted that block diagrams and/or each block in the flowcharts and a combination of thereof may be implemented by a dedicated hardware-based system for performing specified functions/operations or by a combination of dedicated hardware and computer instructions.

Generally, all terms used in the claims are to be interpreted according to their ordinary meaning in the technical field, unless explicitly defined otherwise herein. All references to "a/an/the/said [element, device, component, means, step, etc.]" are to be interpreted openly as referring to at least one instance of said element, device, component, means, unit, step, etc., without excluding a plurality of such devices, components, means, units, steps, etc., unless explicitly stated otherwise. Besides, the indefinite article "a/an" as used herein does not exclude a plurality of such steps, units, modules, devices, and objects, and etc.

Additionally, in a context of the present disclosure, user equipment (UE) may refer to a terminal, a Mobile Terminal (MT), a subscriber station, a portable subscriber station, Mobile Station (MS), or an Access Terminal (AT), and some or all of the functions of the UE, the terminal, the MT, the SS, the portable subscriber station, the MS, or the AT may be included. Furthermore, in the context of the present disclosure, the term "BS" may represent, e.g., a node B (NodeB or NB), an evolved NodeB (eNodeB or eNB), gNB (next generation Node B), a radio header (RH), a remote radio head (RRH), a relay, or a low power node such as a femto, a pico, and so on.

For illustration purposes, description will be first made to the uplink data scheduling of data transmission on the unlicensed band in the LTE system. In LTE system, Downlink Control Indication (DCI) formats 0A, 0B, 4A and 4B have been defined to schedule uplink transmission one the unlicensed band. In these formats, one bit is used to indicate the ending position of physical uplink shared channel (PUSCH), wherein bit value "0" indicates that PUSCH will end at the last symbol of a subframe and bit value "1" indicates that PUSCH will end at the second to last symbol, i.e. the symbol next to the last one. For illustration purposes, the ending symbol of the UL data transmission means the last symbol for UL data transmission.

Thus, in the LTE system, the UE can end the uplink data transmission at the last symbol, or end the second last symbol in a subframe to reserve a predetermined time period. However, due to different numerologies used in the NR system, the NR symbol length may be shorter than the LTE symbol length, and thus the ending position of the data transmission may be quite different.

To this end, in the present disclosure, there is proposed a UL data transmission and a UL data scheduling solution in the NR system to enable the LAA based UL data transmission. Hereinafter, reference will be further made to FIGS. 1 to 14 to describe the UL data transmission and scheduling solution in the NR system. It shall be appreciated that the following embodiments are given only for illustration purposes and the present disclosure is not limited thereto.

Reference is first made to FIG. 1, which schematically illustrates a flow chart of a method of uplink data transmission according to an embodiment of the present disclosure. The method 100 can be performed at a terminal device, for example UE, or other like terminal devices.

As illustrated in FIG. 1, first in step 101, the terminal device may receive, from a network device, information on an ending position of uplink transmission of a terminal device on the unlicensed band. In other word, the terminal device will receive ending position information from the network device or network node such as base station gNB, which may determine the ending position of the UL data transmission and transmit the information which indicates the ending position of uplink data transmission.

Next in step 102, the terminal device may determine the ending position of the UL data transmission from the information on the ending position of uplink data transmission. The determined ending position of the UL data transmission is associated with the to-be-used carrier numerology. The term "numerology" used herein refers to configuration parameters for the structure of a subframe, including, for example, SCS, the number of symbols in a slot, the symbol length, and so on.

In an embodiment of the present disclosure, the possible ending positions may be determined for example as follows. First, it may determine a scaling factor K at least based on the carrier numerology. Then it may determine the ending position of the uplink transmission based on the information on the ending position of uplink transmission and the scaling factor. For example, if the bit value is "0", it means the last symbol in a slot; while if the bit value is "1," the ending position can be determined as for example the (K+1)th last symbol, i.e., the last symbol but K, or symbol X, wherein X=P-(K+1) and P denotes the number of symbols in a slot.

For illustration purposes, reference will be made to FIG. 2 to describe an example manner of determine the value of K, wherein FIG. 2 schematically illustrates a mapping of subcarrier spacings and scaling factors according to an embodiment of the present disclosure.

As illustrated in FIG. 2, there is illustrated a correspondence between the SCS and the scaling factor K. It can be seen that the SCS of 15 KHz is taken as a reference or basis and thus corresponds to the scaling factor of 1, and based on this, scaling factors for 30 KHz, 60 KHz, 120 Khz and 240 KHz can be determined as 2, 4, 8 and 16, which is based on the ratio of their respective SCS to the reference SCS 15 KHz. However, it shall be noted that 15 KHz is just an example of the reference and it is also possible use another carrier spacing, such as 30 KHz. However, it shall be noted that the mapping in FIG. 2 is just given as an example, another mapping can be used as well and moreover, it is also possible to use an equation of instead of a table. An example equation can be give as follows for illustration purposes, X=P-(K+1) wherein K=SCS/the reference SCS (Equation 1) wherein the reference SCS may be for example 15 KHz.

Hereinafter, for illustration purposes, reference will be made to FIGS. 3 to 6 to describe example possible ending positions, wherein FIGS. 3 to 6 schematically illustrate example possible endings positions of the UL data transmission in the NR system with different numerologies according to embodiments of the present disclosure.

FIG. 3 schematically illustrates possible ending positions of the UL data transmission in the NR system with a SCS of 30 KHz according to an embodiment of the present disclosure. As illustrated in FIG. 3, for bit value "0", for both the NR system and the LTR system, it indicates that the ending position is the last symbol, i.e., symbol 13 for the LTE system, symbol 6 for the case of one slot containing 7 symbols in the NR system, or symbol 13 for the case of one slot containing 14 symbols in the NR system. On the other hand, for the bit value "1", it means the second last symbol for the LTE system, i.e., symbol 12; while in the NR system, the SCS=30 KHZ, which means K=2 (see FIG. 2 for example), and thus the ending symbol can be determined as the third last symbol (K+1=3), i.e., symbol 4 for the case of one slot containing 7 symbols, or symbol 11 for the case of one slot containing 14 symbols. Therefore, for the SCS of 30 KHz in the NR system, possible ending positions may include any of symbol 4 and symbol 6 for the case of one slot containing 7 symbols; or symbol 11 and symbol 13 for the case of one slot containing 14 symbols.

FIG. 4 schematically illustrates possible ending positions of the UL data transmission in the NR system with a SCS of 60 KHz according to an embodiment of the present disclosure. In FIG. 4, cases for bit value "0" are same with those in FIG. 3 and thus will not be elaborated herein. On the other hand, for the bit value "1", it means the second last symbol for the LTE system, i.e., symbol 12; while in the NR system, the SCS=60 KHZ, which means K=4 (see FIG. 2 for example), and thus the ending symbol can be determined as the fifth last symbol (K+1=5), i.e., symbol 2 for the case of one slot containing 7 symbols, or symbol 9 for the case of one slot containing 14 symbols. Therefore, for the SCS of 60 KHz in the NR system, possible ending positions may include any of symbol 2 and symbol 6 for the case of one slot containing 7 symbols; or symbol 9 and symbol 13 for the case of one slot containing 14 symbols.

Figure 5:
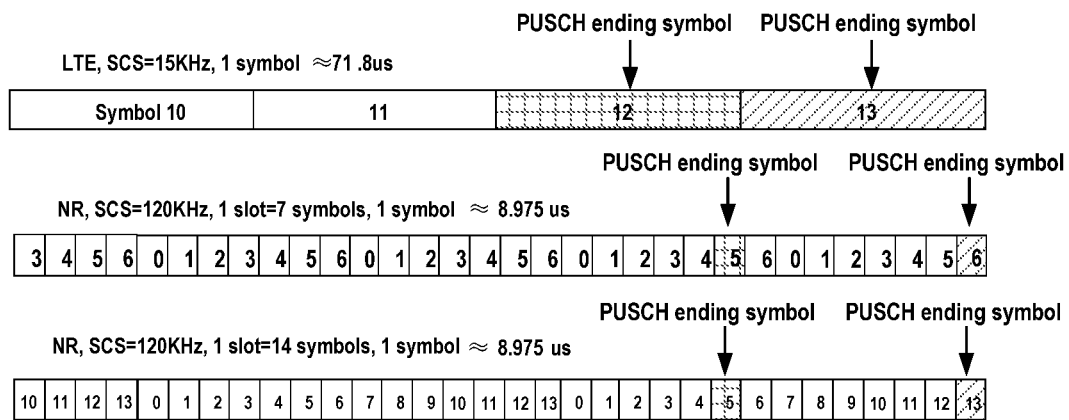
FIG. 5 schematically illustrates example possible ending positions of the UL data transmission in the NR system with a SCS of 120 KHz according to an embodiment of the present disclosure.

FIG. 5 schematically illustrates possible ending positions of the UL data transmission in the NR system with a SCS of 120 KHz according to an embodiment of the present disclosure. In FIG. 5, cases for bit value "0" are same with those in FIGS. 3 to 4 and thus will not be elaborated herein. On the other hand, for the bit value "1", it means the second last symbol for the LTE system, i.e., symbol 12; while in the NR system, the SCS=120 KHZ, which means K=8 (see FIG. 2 for example), and thus the ending symbol can be determined as the ninth last symbol (K+1=9), i.e., symbol 5 in the previous slot for the case of one slot containing 7 symbols, or symbol 5 for the case of one slot containing 14 symbols. Therefore, for the SCS of 120 KHz in the NR system, possible ending positions may include any of symbol 5 in the previous slot and symbol 6 for the case of one slot containing 7 symbols; or symbol 5 and symbol 13 for the case of one slot containing 14 symbols.

Figure 6:
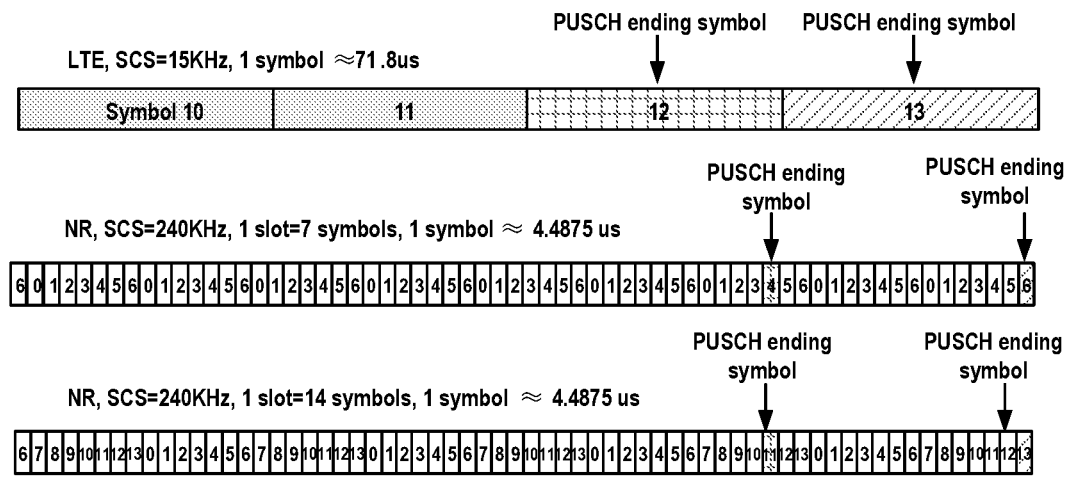
FIG. 6 schematically illustrates example possible ending positions of the UL data transmission in the NR system with a SCS of 240 KHz according to an embodiment of the present disclosure.

FIG. 6 schematically illustrates possible ending positions of the UL data transmission in the NR system with a SCS of 240 KHz according to an embodiment of the present disclosure. In FIG. 6, cases for bit value "0" are same with those in FIGS. 3 to 5, and thus will not be elaborated herein. On the other hand, for the bit value "1", it means the second last symbol for the LTE system, i.e., symbol 12; while in the NR system, the SCS=240 KHZ, which means K=16 (see FIG. 2 for example), and thus the ending symbol can be determined as the seventh last symbol (16+1=17), i.e., symbol 4 in the slot immediately before the previous slot for the case of one slot containing 7 symbols, or symbol 11 in the previous slot for the case of one slot containing 14 symbols. Therefore, for the SCS of 240 KHz in the NR system, possible ending positions may include any of symbol 4 in the slot immediately before the previous slot and symbol 6 for the case of one slot containing 7 symbols; or symbol 11 in the previous slot and symbol 13 for the case of one slot containing 14 symbols.

For the above examples, it can be seen that for SCS of 120 KHz or 240 KHz, the ending position might be located in previous slot or the slot immediately before the previous slot since the symbol length is quite smaller. Thus, in an embodiment of the present disclosure, it is possible to use a different mapping from that in FIG. 2. In an embodiment of the present disclosure, the scaling factor can also be determined further based on the number of symbols in a slot, in addition to the SCS. For example, the scaling factor K can be determined as K1 mode P, wherein K1 indicates the scaling factors as illustrated in the example of FIG. 2

Figures 7, 8:
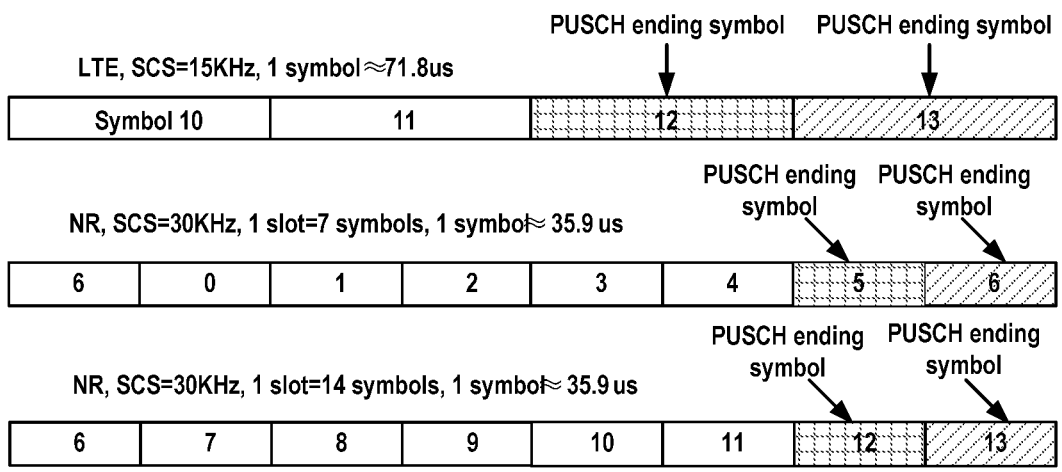
FIG. 7 schematically illustrates another mapping of subcarrier spacings and scaling factors according to an embodiment of the present disclosure.
FIG. 8 schematically illustrates another example possible ending positions of the UL data transmission in the NR system with a SCS of 30 KHz according to an embodiment of the present disclosure.

For illustration purposes, reference will made to FIG. 7 to describe another mapping of subcarrier spacings and scaling factors according to an embodiment of the present disclosure.

As illustrated in FIG. 7, the scaling factors K1 in the second column denote the original scaling factors responding to respective SCS, which is dependent on SCS only. The scaling factors K in the third column denote the scaling factors for the case of one slot containing 7 symbols, as is clear, now, the scaling factor K for SCS of 120 KHZ is determined as 1 (8 mod 7), and the scaling factor K for SCS of 240 KHZ is determined as 2 (16 mod 7). The scaling factors K in the fourth column denote the scaling factors for the case of one slot containing 14 symbols, as is clear, now, the scaling factor K for SCS of 120 KHZ is determined still as 8 (8 mod 14), but the scaling factor K for SCS of 240 KHZ is determined as 2 (16 mod 14). The slot in which the ending symbol is located can be determined also based on the SCS and the number P of symbols in a slot. For example, N can be determined as rounding down of ((K1+1)/P)) and the slot in which the ending symbol can be determined as the Nth slot before the current slot. For example, if N=0, it means the current slot; if N=1, it means the previous slot; if N=2, it means the slot immediately before the previous slot.

Figure 9:
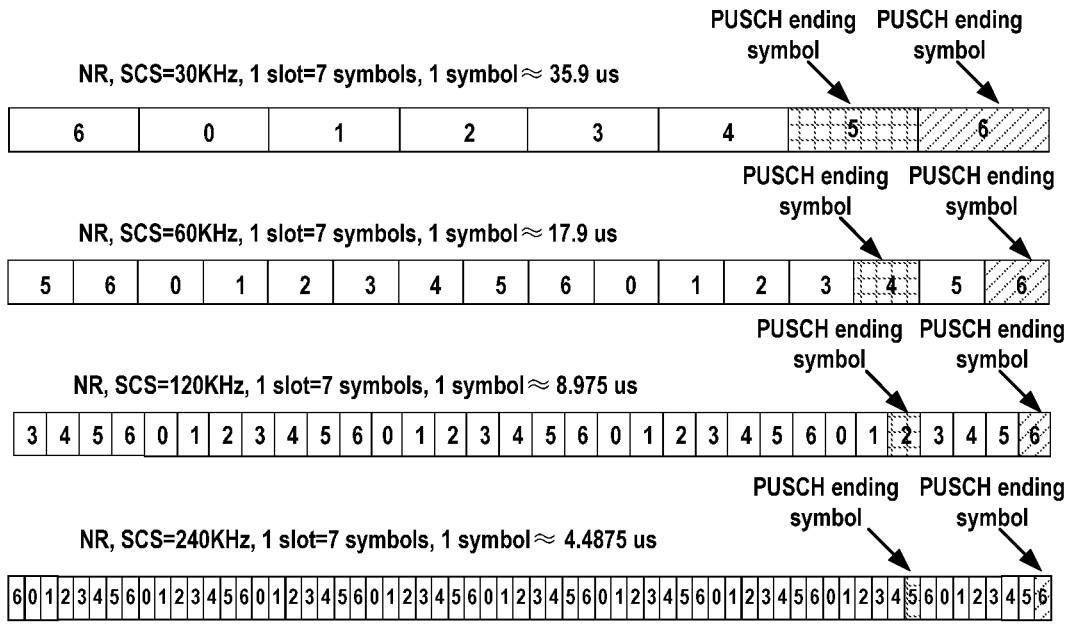
FIG. 9 schematically illustrates another example possible ending positions of the UL data transmission in the NR system with a SCS of 60 KHz, 120 KHz and 240 KHz according to an embodiment of the present disclosure.

FIGS. 8 to 9 illustrate another example possible ending positions of the UL data transmission in the NR system according to embodiments of the present disclosure, wherein the SCS of 30 KHz is taken as the reference or basis of the scaling.

As illustrated in FIG. 8, for both the LTE system and the SCS of the 30 KHz in the NR system, bit values "0" and "1" have the same meanings. In other words, for the bit value "0," it indicates that the ending position is the last symbol, i.e., symbol 13 for the LTE system, symbol 6 for the case of one slot containing 7 symbols in the NR system, or symbol 13 for the case of one slot containing 14 symbols in the NR system. While for the bit value "1," it indicates that the ending position is the second last symbol, i.e., symbol 12 for the LTE system, symbol 5 for the case of one slot containing 7 symbols in the NR system, or symbol 12 for the case of one slot containing 14 symbols in the NR system. Therefore, for the SCS of 30 KHz in the NR system, possible ending positions can includes any of symbol 5 and symbol 6 for the case of one slot containing 7 symbols, or symbol 12 and symbol 13 for the case of one slot containing 14 symbols.

FIG. 9 illustrates another example possible ending positions of the UL data transmission for other SCS in addition to 30 KHz in the NR system according to embodiments of the present disclosure. Different from those in the FIGS. 4 to 6, the scaling is based on the SCS of 30 KHz, instead of the SCS of 15 KHz. That is to say, the scaling factors K corresponding to 30 KHz, 60 KHz, 120 KHz, and 240 KHz are 1, 2, 4, and 8 respectively and the ending position determination rules can be same as those described with reference to FIG. 2 to FIG. 7.

Specifically, in FIG. 9, for the SCS of 60 KHz in the NR system, for bit value "0", for both the NR system and the LTR system, it indicates that the ending position is the last symbol, i.e., symbol 13 for the LTE system, symbol 6 for the case of one slot containing 7 symbols in the NR system, or symbol 13 for the case of one slot containing 14 symbols in the NR system (not illustrated for simplification purposes). On the other hand, for the bit value "1", it means the second last symbol for the LTE system, i.e., symbol 13; while in the NR system, the SCS=60 KHZ, which means K=2 (see FIG. 2 for example), and thus the ending symbol can be determined as the third last symbol (K+1=3), i.e. symbol 4 for the case of one slot containing 7 symbols, or slot 11 for the case of one slot containing 14 symbols (not illustrated for simplification purposes). Therefore, for the SCS of 60 KHz in the NR system, possible ending positions may include any of symbol 4 and symbol 6 for the case of one slot containing 7 symbols; or symbol 11 and symbol 13 for the case of one slot containing 14 symbols.

Similarly, for the SCS of 120 KHz in the NR system, K=4 and possible ending positions may include any of symbol 2 and symbol 6 for the case of one slot containing 7 symbols; or symbol 9 symbol 13 for the case of one slot containing 14 symbols. For the SCS of 240 KHz in the NR system, K=8 and possible ending positions may include any of symbol 5 in the previous slot and symbol 6 for the case of one slot containing 7 symbols; or symbol 5 and symbol 13 for the case of one slot containing 14 symbols.

It shall be noted that embodiments of the ending position determination based on the scaling are just given for a purpose of illustration, and the present disclosure is not limited thereto. In an embodiment of the present disclosure, the position ending position can be determined based on the predetermined time period M and the numerology. The predetermined time M can be for example a time period required to be reserved before the following slot. For example, M can be 25 ns, which can be used for CCA by the UE in the LTE system. The ending position can be determined by the following equation:

$$\text{Symbol } S=(L+1)\text{th last symbol, } L=\text{ceiling } (M/\text{the symbol length})  \quad \text{(Equation 2)}$$

wherein the Ceiling herein means a roundup operation. For example, if L=1, it means the ending symbol is the second last symbol (L+1=2), and L=2, it means the ending symbol is the third last symbol (L+1=3) and so on.

Figure 10:
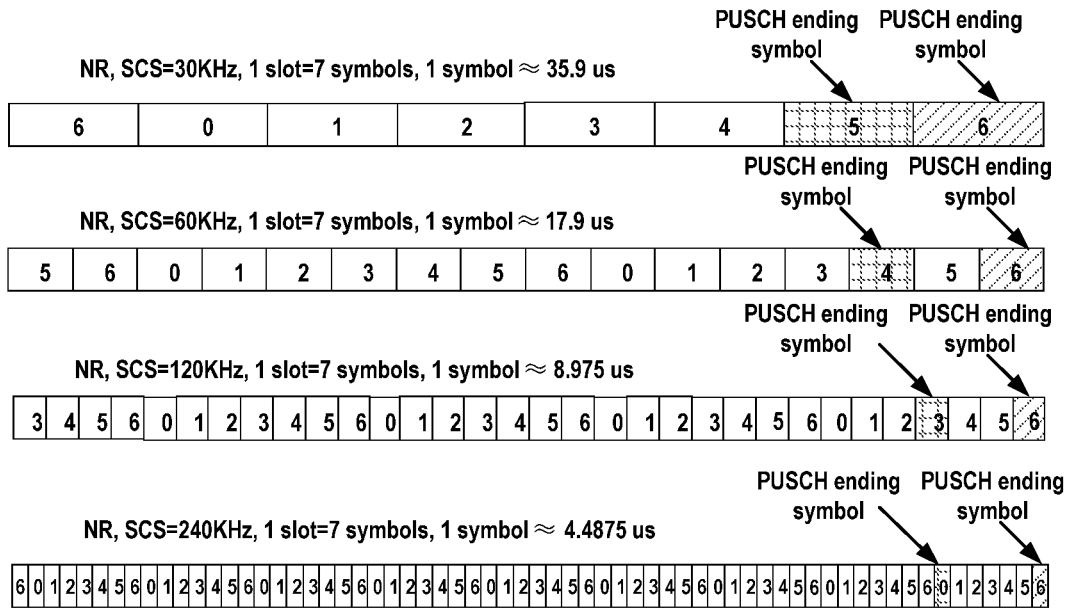
FIG. 10 schematically illustrates further example possible ending positions of the UL data transmission in the NR system with a SCS of 30 KHz, 60 KHz, 120 KHz and 240 KHz according to an embodiment of the present disclosure.

FIG. 10 illustrates further example possible ending positions of the UL data transmission for SCS of 30 KHz, 60 KHz, 120 KHz and 240 KHz in the NR system according to embodiments of the present disclosure. Different from those in the FIGS. 4 to 6 and FIGS. 8 to 9, the ending symbol is based on the SCS and the predetermined time period M, wherein M is assumed as 25 μs herein. since the symbol lengths for the SCS of 30 KHz, 60 KHz, 120 KHz, and 240 KHz are about 35.9 ns, 17.9 ns 8.975 ns and 4.4875 ns respectively, values of parameter L corresponding thereto are 1, 2, 3, and 6 respectively based the operation of ceiling (M/the symbol length).

Specifically, as illustrated in FIG. 10, for the SCS of 30 KHz in the NR system, for bit value "0", for both the NR system and the LTR system, it indicates that the ending position is the last symbol, i.e., symbol 13 for the LTE system, symbol 6 for the case of one slot containing 7 symbols in the NR system, or symbol 13 for the case of one slot containing 14 symbols in the NR system (not illustrated for simplification purposes). On the other hand, for the bit value "1", the SCS=30 KHZ, which means L=1 as described hereinabove, and thus the ending symbol can be determined as the second last symbol (L+1=2), i.e. symbol 5 for the case of one slot containing 7 symbols, or symbol 12 for the case of one slot containing 14 symbols (not illustrated for simplification purposes). Therefore, for the SCS of 30 KHz in the NR system, possible ending positions can includes any of symbol 5 and symbol 6 for the case of one slot containing 7 symbols, or symbol 12 and symbol 13 for the case of one slot containing 14 symbols.

Similarly, for the SCS of 60 KHz in the NR system, L=2 and possible ending positions may include any of symbol 4 (L+1=3) and symbol 6 for the case of one slot containing 7 symbols; or symbol 11 and symbol 13 for the case of one slot containing 14 symbols (not illustrated for simplification purposes). For the SCS of 120 KHz in the NR system, L=3 and possible ending positions may include any of symbol 3 (L+1=4) and symbol 6 for the case of one slot containing 7 symbols, or symbol 10 and symbol 13 for the case of one slot containing 14 symbols (not illustrated for simplification purposes). For the SCS of 240 KHz in the NR system, K=6 and possible ending positions may include any of symbol 0 (L+1=7) and symbol 6 for the case of one slot containing 7 symbols, or symbol 7 and symbol 13 for the case of one slot containing 14 symbols (not illustrated for simplification purposes).

The information on when to end the UL data transmission on the unlicensed band can be received from the network device in any suitable manners. For example, the information can be carried in DCI, RRC signaling, or etc. For example, it may use several bits to explicitly indicate the ending position of the UL data transmission on the unlicensed band alone, or alternatively indicate, together with further information, the ending position of the UL data transmission on the unlicensed band.

In an embodiment of the present disclosure, the information on the ending position of uplink data transmission can indicate the determined ending position of uplink data transmission of the terminal device alone. In the LTE system, only one bit is used to indicate the ending symbol, which the bit value "0" means the ending symbol is the last symbol and the bit value "1" means the second last symbol, i.e., the last symbol but one. In the NR system, two or more bits can be used to indicate more possible ending positions of the UL data transmission on the unlicensed band than the one bit. As an example, two bits in DCI can be used to indicate two additional possible ending positions for UL data transmission on the unlicensed band in the NR system. As another example, three bits in DCI can be used to indicate six additional possible ending positions for UL data transmission on the unlicensed band in the NR system. In such a case, these bits themselves can indicate the ending position for UL data transmission on the unlicensed band in the NR system.

The information on the ending position of uplink data transmission can indicate the ending symbol of the uplink data transmission in any manners. For example, the information can indicate an ending symbol of the uplink data transmission in a subframe. Or alternatively, the information can indicate the number of empty symbols at the end of a subframe.

In another embodiment of the present disclosure, the information on the determined ending position of uplink data transmission can indicate, together with the carrier numerology, the ending position of uplink data transmission of the terminal device. From the description with reference to FIGS. 3 to 10, it can be seen that the possible ending positions are related to the carrier numerology to be used in the NR system. Thus, it is also possible to reuse, in combination with the carrier numerology, the one bit indication used for the PUSCH ending position in the LTR system. That is to say, the actual ending position of the UL data transmission can be derived from the one bit value indicating the ending position of uplink data transmission and the carrier numerology in the NR system.

As an example, if the information on the ending position of uplink data transmission indicates "1", for a terminal device in the LTE system, it means the second last symbol, i.e. symbol 12; however, for a terminal device in the NR system, it might means a different symbol, which is dependent on the numerology used in the NR system. In such a case, it may further determine the actual ending position by means of the numerology. For example, for the embodiments described with reference to FIGS. 3 to 6, if the SCS is 60 KHz, then K=4 and thus it means symbol 2 for the case of one slot containing 7 symbols, or symbol 9 for the case of one slot containing 14 symbols. As another example, for the embodiments described with reference FIGS. 8 to 9, if the SCS is 60 KHz, then K=2 and thus it means symbol 4 for the case of one slot containing 7 symbols, or symbol 11 for the case of one slot containing 14 symbols. As a further example, for the embodiments described with reference FIG. 10, if the SCS is 60 KHz, then L=2 and thus it means symbol 4 for the case of one slot containing 7 symbols, or symbol 11 for the case of one slot containing 14 symbols.

In another embodiment of the present disclosure, it can provide, for respective numerologies, different mapping tables between the ending positions and the information on ending positions of uplink data transmission. Thus, the ending position of uplink data transmission can be determined based on the information on the ending position of uplink data transmission and a mapping between information on ending positions of uplink data transmission and ending positions of uplink data transmission, which is corresponding to the carrier numerology. In such a case, it may first choose a mapping table corresponding to the carrier numerology in response to the reception of the information on the ending position of uplink data transmission, and then obtain the indicated ending position from the mapping table using the information on the ending position of uplink data transmission.

For illustration purposes, Tables 1 and 2 give the PUSCH ending position for SCS=30 KHz and for SCS=60 KHz respectively based on ending position determination rule described with reference to FIGS. 3 to 6. When the carrier numerology is 30 KHz, Table 1 may be chosen, while the carrier numerology is 60 KHz, Table 2 may be chosen. With the information on the ending position of uplink data transmission, e.g. "1", the ending position, symbol 4 or 11 can be obtained based on the mapping Table 1 if the SCS is 30 KHz, and symbol 2 or 9 can be obtained based on the mapping Table 2 if the SCS is 60 KHz.

TABLE 1

PUSCH ending position for SCS = 30 KHz

| Value | PUSCH ending position for P = 7 | PUSCH ending position for P = 14 |
|---|---|---|
| 0 | symbol 6 | Symbol 13 |
| 1 | Symbol 4 | symbol 11 |

TABLE 2

PUSCH ending position for SCS = 60 KHz

| Value | PUSCH ending position for P = 7 | PUSCH ending position for P = 14 |
|---|---|---|
| 0 | symbol 6 | Symbol 13 |
| 1 | Symbol 2 | symbol 9 |

It shall be noted that PUSCH ending position for other values of SCS, like 120 KHz, 240 KHz can be given in a similar way. In addition, it shall be noted that the above mapping tables are given based on ending position determination rule described with reference to FIGS. 3 to 6 and for other ending position determination rules such as those described with reference to FIGS. 8 to 9 and FIG. 10, similar mapping tables can be established. In addition, it shall be also noted that the above tables are just illustrated for purposes and the present disclosure is not limited thereto.

In an embodiment of the present disclosure, it can provide a relationship between the actual ending position with the information on the ending position of uplink data transmission and the carrier numerology, wherein the relationship may contain the carrier numerology as a parameter. Thus, the ending position of uplink data transmission can be determined based on the information on the ending position of uplink data transmission, the to-be-used carrier numerology and a relationship between the information on the ending position of uplink data transmission and ending position of uplink data transmission. As an example, the relationship described with reference to Equation 1 can be taken as an example of the relationship equation to determine the symbol X. The slot in which the symbol X is located can be determined by a roundup operation of (K/P), or (M/the symbol length), or any suitable means.

With embodiments of the present disclosure, it could enable the UL data transmission on the unlicensed band in the NR system and thus improve the performance of the NR system.

Figure 11:
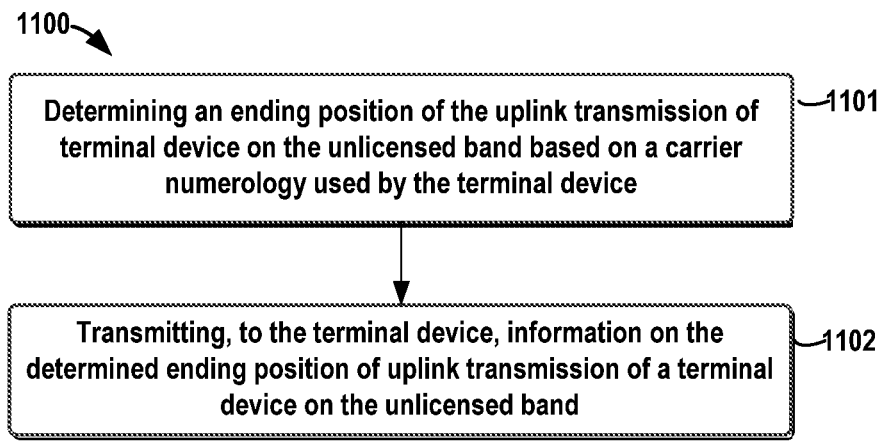
FIG. 11 schematically illustrates a flow chart of a method of uplink data scheduling according to an embodiment of the present disclosure.

FIG. 11 illustrates schematically illustrates a flow chart of a method 1100 of uplink data scheduling according to an embodiment of the present disclosure. The method 1100 can be performed at a network device or network node, for example gNB, or other like network devices.

As illustrated in FIG. 11, first in step 1101, the network device may determine the ending position of uplink data transmission of a terminal device on the unlicensed band based on a carrier numerology.

In another embodiment of the present disclosure, the determining an ending position of the uplink transmission of terminal device may comprise determining a scaling factor at least based on the carrier numerology, and determining the ending position of the uplink transmission based on the scaling factor. For example, it may refer to those embodiments described with reference to FIGS. 3 to 6 and determine, for a SCS of 120 KHz and one slot containing 7 symbols, to end the UL data transmission at symbol 5, while for a SCS of 60 KHz, end the UL data transmission at symbol 2.

In an embodiment of the present disclosure, the determining an ending position of the uplink transmission of terminal device may comprise determining the ending position of the uplink transmission based on a predetermined time period, and the carrier numerology to reserve the predetermined time period. For example, it may refer to those embodiments described with reference to FIG. 10 and determine, for a SCS of 120 KHz and one slot containing 7 symbols, to end the UL data transmission at symbol 3, while for a SCS of 60 KHz, end the UL data transmission at symbol 4.

Then, in step 1102, the network device can determine information on the determined ending position of uplink data transmission to indicate when the UL data transmission shall end.

In an embodiment of the present disclosure, the information on the determined ending position of uplink data transmission may indicate, together with the carrier numerology, the determined ending position of uplink data transmission of the terminal device. From the description with reference to FIGS. 3 to 10, it can be seen that the possible ending positions are related to the carrier numerology to be used in the NR system. Thus, it is also possible to reuse, in combination with the to-be-used numerology, the one bit indication as used for the PUSCH ending position in the LTE system. That is to say, the actual ending position of the UL transmission can be derived from the information on the determined ending position of uplink data transmission and the to-be-used carrier numerology in the NR system. For example, if it is determined to end the UL data transmission at the last symbol, a one bit value "0" can be transmitted the terminal device, while for other symbol not the last symbol, a one bit value "1" can be transmitted the terminal device.

In another embodiment of the present disclosure, the information on the determined ending position of uplink data transmission may indicate the determined ending position of uplink data transmission of the terminal device alone. For example, two or more bits can be used to indicate more possible ending positions of the UL data transmission on the unlicensed band than the one bit used for the PUSCH ending position in the LTE system. As an example, two bits in DCI can be used to indicate two additional possible ending positions for UL data transmission on the unlicensed band in the NR system. As another example, three bits in DCI can be used to indicate six additional possible ending positions for UL data transmission on the unlicensed band in the NR system. In such a case, these bits themselves can indicate the ending position for UL data transmission on the unlicensed band in the NR system.

In an embodiment of the present disclosure, the determining an ending position of the uplink transmission of terminal device may comprise determining the ending position of the uplink transmission based on a predetermined time period, and the carrier numerology to reserve the predetermined time period.

In another embodiment of the present disclosure, the determining an ending position of the uplink transmission of terminal device may comprise determining a scaling factor at least based on the carrier numerology, and determining the ending position of the uplink transmission based on the scaling factor.

Furthermore, the information on the ending position of uplink data transmission can indicate the ending symbol of the uplink data transmission in any manners. For example, the information can indicate an ending symbol of the uplink data transmission in a subframe. Or alternatively, the information can indicate the number of empty symbols at the end of a subframe.

Embodiments of the method of UL data scheduling are described in brief hereinbefore with reference to FIG. 11. However, for some details shared by the UL data transmission at the terminal device, one may refer to description with reference to FIGS. 1 to 10.

Figure 12:
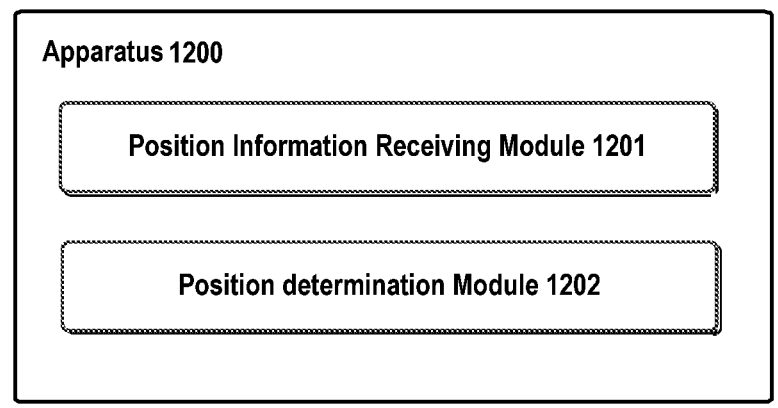
FIG. 12 schematically illustrates a block diagram of an apparatus for uplink data transmission according to an embodiment of the present disclosure.

FIG. 12 schematically illustrates a block diagram of an apparatus for uplink data transmission according to an embodiment of the present disclosure. Apparatus 1200 can be implemented at a terminal device such as the UE.

As illustrated in FIG. 12, Apparatus 1200 may include a position information receiving module 1201 and a position determination module 1202. The position information receiving module 1201 may be configured to receive, from a network device, information on an ending position of uplink transmission of a terminal device on the unlicensed band. The position determination module 1202 may be configured to determine the ending position of the uplink transmission from the information on the ending position of uplink transmission, wherein the determined ending position of the uplink transmission is associated with a carrier numerology used by the terminal device.

In an embodiment of the present disclosure, the information on an ending position of uplink transmission can indicate, together with the carrier numerology, the ending position of the uplink transmission. In such a case, the position determination module 1202 may be configured to determine the ending position of uplink data transmission based on the information on the ending position of uplink transmission and the carrier numerology.

For example, the position determination module 1202 may be configured to determine the ending position of uplink data transmission based on the information on the ending position of uplink data transmission and a mapping between information on ending positions of uplink data transmission and ending positions of uplink data transmission, which is corresponding to the to-be-used carrier numerology.

As another example, the position determination module 1202 may be configured to determine the ending position of uplink data transmission based on the information on the ending position of uplink data transmission, the to-be-used carrier numerology and a relationship between the information on ending positions of uplink data transmission and ending positions of uplink data transmission, the relationship containing the to-be-used carrier numerology as a parameter.

In another embodiment of the present disclosure, the information on the ending position of uplink data transmission may indicate the determined ending position of uplink data transmission of the terminal device alone.

In a further embodiment of the present disclosure, the position determination module 1202 may be configured to determine the ending position of the uplink transmission based on a predetermined time period, and the carrier numerology to reserve the predetermined time period.

In a still further embodiment of the present disclosure, the position determination module 1202 may be configured to determine a scaling factor at least based on carrier numerology and determine the ending position of the uplink transmission based on the information on the ending position of uplink transmission and the scaling factor.

In a still further embodiment of the present disclosure, the information on an ending position of the uplink transmission may indicate any of: an ending symbol of the uplink data transmission in a subframe and the number of empty symbols at the end of a subframe.

Figure 13:
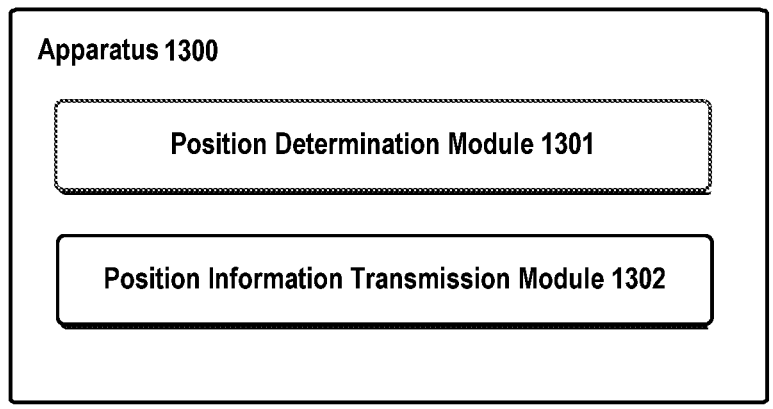
FIG. 13 schematically illustrates a block diagram of an apparatus for uplink data scheduling according to an embodiment of the present disclosure.

FIG. 13 schematically illustrates a block diagram of an apparatus for uplink data scheduling according to an embodiment of the present disclosure. Apparatus 1300 can be implemented at a network device such as gNB.

As illustrated in FIG. 13, apparatus 1300 may comprise a position determination module 1301 and the position information transmission module 1302. The position determination module 1301 may be configured to determine an ending position of the uplink transmission of terminal device on the unlicensed band based on a carrier numerology used by the terminal device. The position information transmission module 1302 may be configured to transmit, to the terminal device, information on the determined ending position of uplink transmission of a terminal device on the unlicensed band.

In an embodiment of the present disclosure, the information on an ending position of uplink transmission may indicate, together with the carrier numerology, the ending position of the uplink transmission.

In another embodiment of the present disclosure, the information on an ending position of uplink transmission may indicate the ending position of the uplink transmission alone In a further embodiment of the present disclosure, the position information transmission module 1302 may be further configured to determine an ending position of the uplink transmission of terminal device by determining the ending position of the uplink transmission based on a predetermined time period, and the carrier numerology to reserve the predetermined time period.

In a still further embodiment of the present disclosure, the position information transmission module 1302 may be further configured to determine a scaling factor at least based on the carrier numerology, and determining the ending position of the uplink transmission based on the scaling factor.

In a yet further embodiment of the present disclosure, the ending position of the uplink transmission may indicate any of an ending symbol of the uplink data transmission in a subframe and the number of empty symbols at the end of a subframe.

Hereinbefore, apparatuses 1200 and 1300 are described with reference to FIGS. 12 and 13 in brief. It can be noted that the apparatuses 1200 and 1300 may be configured to implement functionalities as described with reference to FIGS. 1 to 11. Therefore, for details about the operations of modules in these apparatuses, one may refer to those descriptions made with respect to the respective steps of the methods with reference to FIGS. 1 to 11.

It is further noted that components of the apparatuses 1200 and 1300 may be embodied in hardware, software, firmware, and/or any combination thereof. For example, the components of apparatuses 1200 and 1300 may be respectively implemented by a circuit, a processor or any other appropriate selection device.

Those skilled in the art will appreciate that the aforesaid examples are only for illustration not limitation and the present disclosure is not limited thereto; one can readily conceive many variations, additions, deletions and modifications from the teaching provided herein and all these variations, additions, deletions and modifications fall the protection scope of the present disclosure.

In addition, in some embodiment of the present disclosure, apparatuses 1200 and 1300 may comprise at least one processor. The at least one processor suitable for use with embodiments of the present disclosure may include, by way of example, both general and special purpose processors already known or developed in the future. Apparatuses 1200 and 1300 may further comprise at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause apparatuses 1200 and 1300 to at least perform operations according to the method as discussed with reference to FIGS. 1 to 11 respectively.

Figure 14:
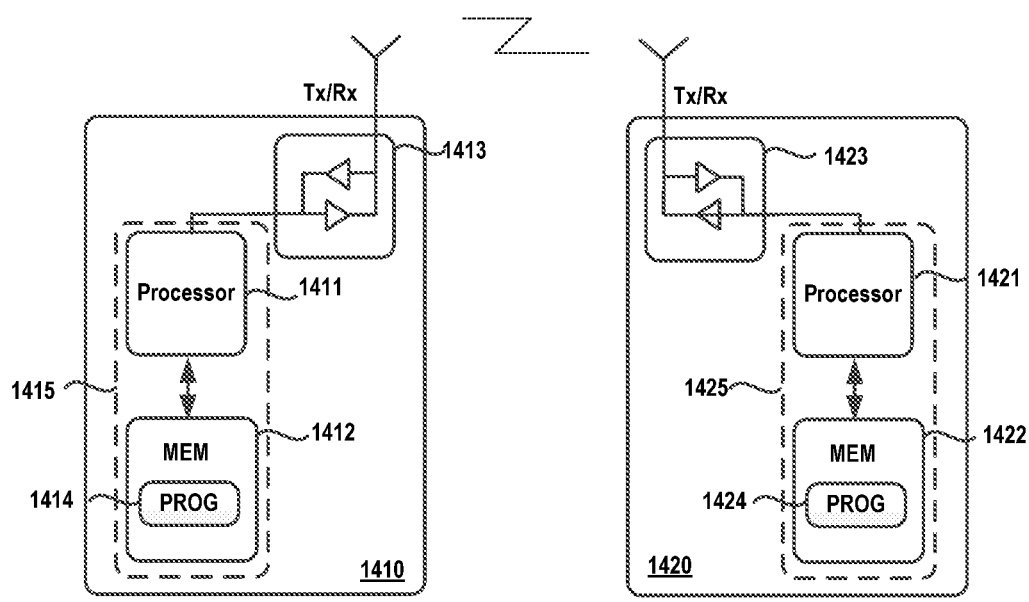
FIG. 14 schematically illustrates a simplified block diagram of an apparatus 1410 that may be embodied as or comprised in a network device like gNB, and an apparatus 1420 that may be embodied as or comprised in a terminal device like UE as described herein.

FIG. 14 further illustrates a simplified block diagram of an apparatus 1410 that may be embodied as or comprised in a network device like a base station in a wireless network and an apparatus 1420 that may be embodied as or comprised in a terminal device like UE as described herein.

The apparatus 1410 comprises at least one processor 1411, such as a data processor (DP) and at least one memory (MEM) 1412 coupled to the processor 1411. The apparatus 1410 may further comprise a transmitter TX and receiver RX 1413 coupled to the processor 1411, which may be operable to communicatively connect to the apparatus 1420. The MEM 1412 stores a program (PROG) 1414. The PROG 1414 may include instructions that, when executed on the associated processor 1411, enable the apparatus 1410 to operate in accordance with embodiments of the present disclosure, for example the method 1100. A combination of the at least one processor 1411 and the at least one MEM 1412 may form processing means 1415 adapted to implement various embodiments of the present disclosure.

The apparatus 1420 comprises at least one processor 1421, such as a DP, and at least one MEM 1422 coupled to the processor 1421. The apparatus 1420 may further comprise a suitable TX/RX 1423 coupled to the processor 1421, which may be operable for wireless communication with the apparatus 1410. The MEM 1422 stores a PROG 1424. The PROG 1424 may include instructions that, when executed on the associated processor 1421, enable the apparatus 1420 to operate in accordance with the embodiments of the present disclosure, for example to perform the method 100. A combination of the at least one processor 1421 and the at least one MEM 1422 may form processing means 1425 adapted to implement various embodiments of the present disclosure.

Various embodiments of the present disclosure may be implemented by computer program executable by one or more of the processors 1411, 1421, software, firmware, hardware or in a combination thereof.

The MEMs 1412 and 1422 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 1411 and 1421 may be of any type suitable to the local technical environment, and may include one or more of general purpose computers, special purpose computers, microprocessors, digital signal processors DSPs and processors based on multicore processor architecture, as non-limiting examples.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:
1. A method performed by a terminal device, comprising:
receiving, from a network device, a downlink control information comprising a bit field indicating information associated with an ending position for an uplink transmission in an unlicensed band; and
determining a position of the uplink transmission based on the information, a first subcarrier spacing, and a second subcarrier spacing configured for the terminal device.

2. The method of claim 1, wherein the position of the uplink transmission is determined based on a ratio between the first subcarrier spacing and the second subcarrier spacing.

3. The method of claim 1, wherein the bit field is indicated by one, two, or more bits.

4. A terminal device comprising a processor configured to:
- receive, from a network device, a downlink control information comprising a bit field indicating information associated with an ending position for an uplink transmission in an unlicensed band; and
- determine a position of the uplink transmission based on the information, a first subcarrier spacing, and a second subcarrier spacing configured for the terminal device.

5. The terminal device of claim 4, wherein the bit field is indicated by one, two, or more bits.

6. The terminal device of claim 4, wherein the position of the uplink transmission is determined based on a ratio between the first subcarrier spacing and the second subcarrier spacing.

7. A method performed by a network device comprising:
- transmitting, to a terminal device, a downlink control information comprising a bit field indicating information associated with an ending position for an uplink transmission in an unlicensed band; and
- transmitting, to the terminal device, configuration parameters comprising a first subcarrier spacing and a second subcarrier spacing related with the uplink transmission.

8. The method of claim 7 further comprising receiving the uplink transmission from the terminal device.

* * * * *